United States Patent Office 3,298,833
Patented Jan. 17, 1967

---

3,298,833
METHOD FOR STORING INFORMATION
Joseph Gaynor, Schenectady, N.Y., assignor to General Electric Company, a corporation of New York
No Drawing. Filed Sept. 22, 1965, Ser. No. 489,422
1 Claim. (Cl. 96—27)

This application is a continuation-in-part of Serial No. 79,530, filed December 30, 1960, bearing the same title, assigned to the same assignee, and now abandoned.

This invention relates in general to a method and system for storing information in a polymeric medium. More particularly, this invention pertains to a system which is suitable for the direct recording and development of information on the same polymeric medium to produce a high resolution and a high density storage medium for the information.

Information has been recorded on a deformable thermoplastic medium in the form of minute light modifying deformations. One such method for recording and developing directly on the deformable medium employs an electron beam to deposit electrostatic charges on the medium surface in a pattern representing the information to be stored. The deformable storage medium is then softened by the application of heat or the like and the forces due to the electrostatic charge pattern deform the softened material to produce physical deformations corresponding to the charge pattern. Upon cooling the medium the deformations become permanently fixed on the surface of the storage medium and are thereby permanently stored unless deliberately erased by reheating. The information stored in the form of these deformations is retrieved by projecting a beam of light through the medium. The projected light is deflected or refracted by the deformations, depending on their nature, to produce a spatial light image corresponding to the original image. The spatial light image may be viewed directly or be converted to electrical signals by means of such known light sensing devices as photomultipliers or the like. A complete disclosure of such a system may be found in United States Letters Patent 3,113,179 issued December 3, 1963, entitled "Method and Apparatus for Recording," filed February 15, 1960 in the name of William E. Glenn and assigned to the assignee of the present invention.

In another such method for the direct recording and development of information on a deformable storage medium, the information is stored in the form of textural modifications in the storage medium. The textural changes are generaly gas vesicles, bubbles, or holes in the deformable storage medium and are produced by the decomposition of a gas-forming compound contained therein. The information is first recorded by exposing a deformable medium containing a light sensitive compound to activating radiation in a pattern representing the information to be stored. The latent image pattern results from the selective decomposition of the light sensitive compound according to the exposure pattern whereby the gaseous decomposition products of the light sensitive compound diffuse internally into the surrounding deformable medium. The latent image pattern is developed to form textural modifications in the deformable medium by heating the medium which causes the diffused gas to expand and form a visible image comprising gas vesicles, bubbles, or holes in the deformable medium corresponding to the latent image pattern.

It would be desirable to provide a method for direct recording and development of information in a polymeric medium which does not require heating of the medium to develop a visible image of the information being stored. The heating step disclosed in both of the above described methods employs an external heat source which naturally adds to the complexities of both the method and apparatus for development of the visible image. The deformable medium is necessarily limited to a thermoplastic type polymer. In addition, both methods employ a backing strip to provide the necessary support for the deformable medium in a softened state. It would also be desirable to eliminate the time for the heating steps since it obviously reduces the speed for the storage process. For these and other reasons, it would be desirable to directly record and develop information in a deformable storage medium without necessity for an intervening heating step.

It is a primary object of the invention to provide a novel method and system for the direct deposition, development, and storage of information in the same polymeric medium.

It is still another object of the invention to provide a simpler technique for storing information in the form of light or visible images in a polymeric storage medium.

It is still another object of the invention to provide a high resolution and high information density storage system.

It is still another object of the invention to provide a method and system for the storage of information as a visible image in a deformable medium which does not require a separate external energy step or use of developing agents to produce the visible image.

Briefly, the present method contemplates the direct deposition and storage of information on a transparent polymeric medium by localized conversion of the polymeric medium corresponding to the information pattern. Accordingly, information to be stored is transmitted by activating radiation to the polymeric medium and localized optical discontinuities are formed in the polymeric medium according to the activating radiation pattern. The optical discontinuities which constitute a visible image of the recorded information exist generally as bubbles, carbon spots, and even localized refractive index changes in the polymeric medium. The polymeric medium which is suitable for the deformable storage medium in accordance with the practice of the invention comprises generally a solid polymer which is transparent in the wavelength region of the activating radiation employed and which contains discrete radiation-absorptive particles. The optical discontinuities which form the developed image of the recorded information in the polymeric film are located in the immediate vicinity of the radiation-absorptive particles contained in the polymeric medium. The exact reason why the optical discontinuities occur in the vicinity of the radiation-absorptive particles is not clear, but the phenomenon is unquestionably due in part to the absorption of the activating radiation by the radiation-absorptive particles followed by emission of the absorbed energy in a form such as heat or shorter wavelength radiation which produces the optical discontinuities in the polymeric medium.

The general nature of the invention having been set forth, the following examples are presented to illustrate but not to limit the preferred means for carrying out the invention.

Example 1

Into a suitable vessel equipped with means for mechanical agitation there is added 1000 parts of a 10% by weight polystyrene solution in an aromatic hydrocarbon solvent together with one part carbon black and the mixture is mechanically agitated at room temperature for a period of approximately 10 to 15 minutes. A uniform dispersion of the carbon black in the polystyrene solution results which does not settle out during a reasonable storage period.

The dispersion is cast at room temperature as an approximately 4 mil thick film and the solvent removed therefrom by conventional means to produce a solid polystyrene layer containing uniformly dispersed carbon black.

The above solid polystyrene layer is employed as a storage medium by exposing the surface to a single discharge from a fused silica high-intensity flash lamp, the discharge being transmitted through an ordinary photographic type transparency. The exposure time lasts approximately 3 milliseconds during which the lamp is operated at approximately 648 microfarads and 4000 volts to deliver about 2500 joules of energy. The exposure is made in air at room temperature during which the polymeric medium is exposed directly to the activating radiation of the fused silica flash lamp. A reverse type print of the transparency image is obtained on the polymeric medium in the form of minute gas bubbles within the polymer. The diameters of the gas bubbles are sufficiently larger than the diameters of the carbon black particles to permit a readout of the stored information by conventional optical techniques.

*Example 2*

To illustrate further compositions within the contemplation of the invention which are suitable for the polymeric medium, a thin film is prepared according to the method of Example 1 except that for the liquid composition employed therein there is substituted a mixture of 0.1 part of powdered iron with 1000 parts of a 10% by weight polyethylene terephthalate solution in an aromatic hydrocarbon solvent. The results obtained by exposure of the solid film to activating radiation in accordance with the method of Example 1 are substantially comparable to the results obtained in the said example.

*Example 3*

To illustrate other methods for the direct deposition and development of information on a polymeric medium along with still other compositions all within the contemplation of the invention, a polymeric medium containing a decomposable azide compound is prepared and exposed to activating radiation from the electron beam of an electron microscope.

Accordingly, a thin solid film is prepared according to the method of Example 1 from a 30% solids toluene solution of styrene-butadiene polymer containing approximately 1% by weight of the polymer of $\alpha$-lead azide. The azide employed is not soluble in the polymer solution and in uniformly dispersed therein with minor amounts of a dispersing agent according to conventional techniques. The solid polymeric medium is exposed to a photographic type transparency using a commercial electron microscope arranged to work in reflection and operated at a beam strength of approximately 200 microamperes at an accelerating voltage of about 75 kv. Gas bubbles are produced in the polymeric medium at locations adjacent to the azide particles in a pattern corresponding to the image of the positive transparency.

The information storage medium comprises a solid mixture of a film-forming organic polymer with a plurality of small discrete radiation-absorptive particles. The radiation-absorptive particles are uniformly dispersed in a matrix of the polymer by conventional means such as described in the above examples. Exposure of the storage medium to high-energy radiation in a pattern representative of the information to be stored produces optical discontinuities in the polymer matrix corresponding to the exposure pattern. More particularly, exposure of the storage medium produces the optical discontinuities in those portions of the polymer matrix which are adjacent to particles receiving radiation according to the exposure pattern. For example, exposure of a polymeric medium which comprises a thermoplastic polymer matrix containing discrete radiation-absorptive particles which are chemically stable to the irradiating conditions results primarily in the formtaion of gas bubbles in the polymer matrix due to a controlled decomposition of the matrix according to the exposure pattern. Some carbon spots may also be formed in the polymer matrix in response to the irradiation, which carbon may be read along with the bubbles by the same optical means employed for retrieval of the stored information. The gas bubble image may be erased in this type polymer medium to permit reuse of the medium for the storage of additional information. The bubbles are removed by heating the storage medium sufficiently in air to soften the polymer matrix so that the bubbles escape to the surface and collapse or become evacuated by permeation of the gaseous contents into the polymer matrix whereby the evacuated bubbles collapse under ordinary atmospheric pressure.

A non-erasable information pattern can be produced in a polymeric medium according to the practice of the invention by substituting a thermosetting or crosslinked thermoplastic composition for the polymer matrix instead of the preferred thermoplastic type polymer. The visible image produced in a thermosetting or crosslinked thermoplastic type polymeric medium is also the result of localized decomposition of the polymer according to the impinging radiation pattern. It will be realized, of course, that an image pattern produced in this type polymer matrix cannot be removed because of the infusible nature of the material.

Another type information storage medium useful for the practice of the invention comprises a polymeric medium containing discrete radiation-absorptive particles which are decomposed by the impinging radiation, perhaps along with localized decomposition of the polymer matrix in the vicinity of the irradiated particles. Although the primary function of the radiation-absorptive particles in the polymeric medium, as stated hereinbefore, is that of absorbing the impinging radiation and emitting energy in such forms as heat or shorter wave length radiation, certain particles which themselves decompose when irradiated to form particular decomposition products have added utility in the process. More specifically, radiation-absorptive particles which decompose and furnish gaseous decomposition products promote the formation of larger bubbles in the polymer matrix. Advantages following from the formation of larger gas bubbles in the polymeric medium include a clearer visible image and lesser resolution requirements for an optical read-out system.

Thus far, the specific embodiments of the invention disclosed in the above examples and thereinafter discussed all comprise the formation of a visible image pattern in the polymeric medium by means of localized decomposition of the polymer matrix and/or the radiation-absorptive particles. It is to be understood that the present invention contemplates the storage of informtion in a polymeric medium in the form of other optical discontinuities such as localized differences in index of refraction in the polymer matrix. For example, a polymeric medium which comprises a solid crosslinkable thermoplastic polymer matrix containing a plurality of uniformly dispersed chemically inert radiation-absorptive particles develops localized crosslinked portions of the polymer matrix in the vicinity of the discrete particles irradiated according to the exposure pattern. The reaction is believed to occur in response to energy emitted from the irradiated particles in the form of heat or shorter wavelength radiation. The index of refraction for the crosslinked portions of the polymer matrix may differ sufficiently from the index of refraction of uncrosslinked portions so that the information stored in this manner can be read directly by known optical means. Alternately, a visible image is produced on the partially crosslinked polymeric medium in the form of a raised or lowered image by means of an added developing step more fully described in the following Example 4.

Example 4

A polymeric medium is prepared according to the method of Example 1, except that for the polystyrene matrix material there is substituted an equivalent amount of a transparent epoxy resin containing approximately 5% of a conventional crosslinking agent. Such an epoxy resin as "Epon 1001," a diglycidyl ether of bisphenol A, manufactured and sold by the Shell Chemical Company, is preferred because of its optical characteristics, among other reasons. The curing or cross-linking agent should be one which requires the application of heat to cause cross-linking. Dicyandiamide is such a cross-linking agent. It will, of course, be appreciated that these specific materials are exemplary of classes of similar well-known materials which are useful in the practice of this invention. When exposed to high-energy radiation, according to the method of said Example 1, there is formed a localized crosslinked pattern in the polymeric medium corresponding to the radiation recording pattern. This localized cross-linked pattern has a different index of refraction than the nonradiated portions of the medium and the pattern may be directly "read out" by conventional optical means, such as, for example, by well-known Schlieren optical techniques. This pattern may also be recovered, if desired, by the development of a relief or intaglio surface. A solvent for the epoxy resin is thereafter applied to the surface of the irradiated polymeric medium so that the uncrosslinked portions of the polymer matrix are dissolved away to form a relief image which corresponds to the exposure pattern.

Suitable polymers for the matrix of the polymeric storage medium can be selected from the general class of thermoplastic and thermosetting resins which are solids at ordinary temperature and are optically transparent both in the visible region and in the wavelength region of the high-energy radiation employed. Useful polymers can be characterized as film-forming organic polymers which possess a sufficient degree of homogeneity so that there is essentially no particulate contaminants within the polymer matrix. The absence of random contaminants in the polymer matrix is deemed critical to the practice of the invention to prevent decomposition of the polymer matrix at sites of contamination during the information recording process. Decomposition of the polymer matrix at sites of contamination is heterogeneous in character and hinders the development of a visible image in the polymer matrix which can be retrieved readily by ordinary optical means. Satisfactory polymers for use as the polymer matrix of the storage medium include polystyrene, polyethylene terephthalate, polyisolbutylene, polyvinyl chloride, polymethylmethacrylate, regenerated cellulose, and cellulose acetate.

The preferred polymers for the storage medium are optically transparent thermoplastic polymers which exhibit no haziness even after repeated cycles of melting to erase information that is stored on the medium. The preferred polymers are also permeable to the decomposition gases contained in the small bubbles representing the information stored in the medium. Additionally, the preferred polymers possess a sharp fusion point to facilitate erasure of the storage medium containing information together with good oxidation resistance to prevent degradation of the polymeric medium when heated to effect the erasure.

It is desirable to prepare the storage medium in the form of a thin tape for continuous recording and retrieval of the information. A tape contemplated for permanent storage of information comprises a thin film of the polymeric medium possessing adequate mechanical strength for the usual winding and unwinding operations on a mandrel or reel during recording and retrieval of the information. Such tapes may be prepared generally from film of the polymeric medium having thicknesses of four mils or less with the minimum thickness of the film to be governed primarily by the mechanical forces to which the tape will be subjected. The polymer matrix for the tape should possess sufficiently low adhesive characteristics to prevent adhesion between successive layers of a wound tape during the ordinary conditions of storage. A polymer for the tape should also exhibit a low degree of cold-flow to minimize deformation of the tape during storage, which deformation if excessive could actually prevent rapid unwinding of a wound tape.

An erasable tape preferably comprises a thin film of the polymeric medium overlying a flexible backing layer. The backing layer supports the polymeric medium during the restoration process heretofore described, wherein a tape bearing information in the form of a visible bubble pattern is erased by softening the polymer matrix. This general type tape structure is also preferred for the development of a relief image on a partially crosslinked storage medium such as described in Example 4 above. A polymer for the recording layer of the laminated tape, preferably adheres well to the support layer but is not so tacky at ordinary ambient conditions to cause adhesion between successive layers of a wound tape. The preferred material for the backing layer is an optically transparent film-forming organic polymer additionally possessing good radiation resistance and heat resistance. It is especially preferred that the backing layer comprises a thermosetting or crosslinked thermoplastic polymer to prevent loss of mechanical strength in the entire tape during erasure of stored information by softening the polymer matrix. A thermosetting or crosslinked thermoplastic polymer film is also preferred as the backing layer if the information is stored as a relief image on a partially crosslinked polymeric medium. Although a suitable relief image can be produced in an unsupported crosslinkable polymeric medium, as was described in Example 4, the provision of a thermosetting or crosslinked thermoplastic backing layer minimizes the effects of any prolonged contact of a solvent with uncrosslinked portions of the medium. The thickness of the backing layer is not believed critical to the practice of the invention and preferably ranges from less than 1 mil to more than 10 mils.

Examples of flexible materials which can advantageously be employed as the backing material are, for instance, polyethylene terephthalate (which can be obtained by the transesterification of esters of terephthalic acid with divalent alcohols, for example, ethylene glycol as shown in U.S. Patent 2,641,592, Hofrichter, such polyethylene terephthalate being sold by E. I. du Pont de Nemours and Company of Wilmington, Delaware, under the name of "Mylar." A more refined grade of polyester terephthalic acid tape or film found highly appropriate as the basis for recording images (and which contains small interconnected residues from dihydric alcohols, such as propylene glycol-1,3 to reduce crystallinity) is sold by the above manufacturer under the name of "Cronar."

It should be pointed out that a nonflexible backing layer may advantageously be employed if it is desirable to provide a laminated storage medium in forms other than a wound tape. For example, it may be desirable to adapt the storage medium to the plate or slide form generally employed for many ordinary photographic purposes. Suitable materials for a rigid backing layer will generally possess the same general properties outlined for flexible backing materials, including optical transparency, radiation resistance, and heat resistance. Examples of rigid transparent backing materials are glass and certain glassy-like organic polymers such as unsaturated polyester resins, i.e., reaction products of polyhydricalcohols with alpha-saturated alpha-beta-dicarboxylic acids or anhydrides. On the other hand, where the information is to be stored in the form of a relief image in the polymeric medium, it is not required that a transparent backing layer be employed since the information can be retrieved by known contact printing means. It will be possible therefore, to utilize optically opaque materials for the backing layers such as metals, etc.

Materials suitable for the discrete radiation-absorptive particles can most understandably be described along with the changes which occur in the polymeric matrix during the information storage process. More particularly, although the radiation absorbed by the discrete particles is emitted therefrom in the form of heat and/or shorter wavelength radiation to produce specific changes in the polymeric medium, changes also occur in certain types of the radiation-absorptive particles as well. In greater explanation, the changes occurring in the polymeric medium in response to absorption of radiation by the discrete particles include localized decomposition of the polymer matrix to produce gas bubbles therein, localized decomposition of both the polymer matrix and certain decomposable type discrete particles to produce gas bubbles in the polymer matrix, or even localized cross-linking of the polymer matrix to produce such other optical discontinuities in the polymer matrix as index of refraction changes. Hence, it can be seen that radiation-absorptive materials which are radiation resistant as well as materials which decompose forming gaseous decomposition products can be suitably employed to produce the desired localized changes in the polymer matrix. Radiation-resistant materials which have been found especially useful can be characterized as particulate in form, insoluble in the polymer matrix and capable of attaining high temperatures in response to high-energy irradiation. Additionally, it is required that the radiation-resistant materials have an emissivity of at least 0.5 so that a sufficient proportion of the energy absorbed at a given level of irradiation will be emitted to achieve the desired results. This is understandably a broad class of materials and includes such diverse compositions as carbon black, graphite powder, crushed hard carbon, sodium fluorescein, ferric oxide, and iron. It is not believed that the minimum size of the radiation-absorptive particles is critical to the practice of the invention since the decomposition of the polymer matrix will be primarily a function of the elevated temperature reached by the irradiated particles. Thus, radiation-absorptive particles as small as $10^{-3}$ microns can be employed. The maximum size for the radiation-absorptive particles is regulated by other considerations including the method of recording the information and the method for information retrieval. For example, in an optical retrieval system for reading information stored in the form of a visible bubble pattern in a transparent polymer matrix by means of projecting a beam of light through the storage medium the size of the radiation-absorptive particles should be sufficiently smaller than the individual bubbles to facilitate distinction between the bubble pattern and the particles. On the other hand, for system wherein the stored information is in the form of a relief image, the maximum permissible size for the radiation-absorptive particles is one, only slightly less than the deformations of the relief image. For the storage systems described in the preceding examples, a particle size range up to around 100 mesh U.S. screen size is appropriate.

Decomposable materials that can be employed for the radiation-absorptive particles are insoluble or only sparingly soluble in both the solid polymer matrix and in the liquid compositions from which the solid polymer matrix can be obtained. The decomposable materials can be further characterized as particulate in form and decomposing in response to high-energy radiation to form gaseous decomposition products which are also only sparingly soluble in the polymer matrix. Preferred decomposable particles are sufficiently heat resistant to permit the erasure of a polymeric medium containing stored information in the form of a visible bubble pattern by the means heretofore described. The preferred decomposable particles are also optically transparent and possess an index of refraction approximating the index of refraction for the polymer matrix. Such particles facilitate readout of information stored in a polymeric medium as a visible bubble image by optical means which projects visible light directly through the polymeric medium.

Satisfactory decomposable materials for the radiation-absorptive particles include the diazo-compounds, azides, oxalates, perchlorates, acetylides, fulminates, and nitrates. The preferred decomposable compounds are the azides, oxalates, perchlorates, acetylides, nitrates and fulminates, and these explosive-type materials can be distinguished from most diazo-compounds in that less energy is required to initiate decomposition and further, the decomposition proceeds more rapidly. The organic class of azides, oxalates, perchlorates, acetylides, nitrates, and fulminates are especially preferred because of greater thermal, mechanical, and storage stability under ordinary conditions than the inorganic class of these materials. Typical examples of the preferred class of organic decomposable compounds (the class is also more commonly known as "crystalline secondary explosive") include methyl azide, benzene diazonium nitrate, benzene diazonium perchlorate, and p-diazo-diphenyl-amino perchlorate.

The source of high-energy radiation satisfactory for the practice of the invention is not critical and suitable sources include all wavelength light energy, ultrasonic energy, and even beta, alpha, and gamma energy sources. It is merely necessary to select a particular type radiation-absorptive particle for incorporation in the polymeric medium which will absorb the type radiation employed. The quantity of useful radiation to produce the desired results will also be determined generally by the type of radiation-absorptive particles in the polymeric medium. More specifically, for sufficient decomposition to occur in the polymeric medium of Example 1, it is necessary to transmit at least approximately 2500 joules of energy. In contrast thereto, decomposition of the polymeric material containing an inorganic azide compound occurs at energy levels as low as 0.16 joule per $cm.^2$ of individual particles surface area. An intermediate range of irradiation generally between about 500–2000 joules is required to decompose the organic class of explosive-type materials described heretofore. The ambient conditions for irradiation of the polymeric medium are not critical so that the desired results may be obtained by irradiation of the polymeric medium in air, vacuum, or inert atmosphere.

From the foregoing description, it will be apparent that a general method for storing information on a polymer film together with a particular type of storage medium utilizable therefor has been provided. Certain embodiments of the present method have been shown to be particularly suitable for high speed information storage whereby information is available immediately for readout after initial deposition in the polymeric medium. In the embodiments utilizing decomposition of the radiation-absorptive particles and/or the polymer matrix, the visible image produced has the known advantageous "gray scale" characteristics. In addition, illustrated embodiments provide erasable and therefore reusable storage mediums.

While the method of the invention is uniquely adapted for the direct deposition and development of information on a polymeric medium which does not require a vacuum system for recording the information or separate heating means for the development of the information, it will be obvious that the present type polymeric medium disclosed can be used in the electronic recording process as set forth in an application for United States Letters Patent, Serial No. 698,167, entitled, "Method and Apparatus for Electronic Recording," filed November 22, 1957, in the name of William E. Glenn.

It is intended to limit the present invention, therefore, only in accordance with the scope of the following claim.

What I claim as new and desire to secure by Letters Patent of the United States is:

The method of storing information comprising the steps of providing a recording medium comprising a thin solid film of an optically transparent, thermally cross-linkable, organic polymer containing uniformly dispersed, solid, discrete, finely divided, radiation absorptive particles having an emissivity of at least 0.5, exposing said film to an image pattern of high energy radiation of at least 0.1 joule per square centimeter of the surface area of said particles causing said particles to emit sufficient energy in the form of heat substantially simultaneously with said exposure to cause said polymer to cross-link in zones in the vicinity of said irradiated particles to form an image pattern of zones of cross-linked polymer associated with said irradiated particles which corresponds to the illuminated areas of said image pattern, said cross-linked zones forming optical discontinuities in said film which are significantly larger than said particles enabling said image patern to be detectable by visible light and discriminated from said particles.

References Cited by the Examiner

UNITED STATES PATENTS

| | | | |
|---|---|---|---|
| 2,703,283 | 3/1955 | Eggert | 96—88 X |
| 2,844,733 | 7/1958 | Miller et al. | 260—65.1 |
| 2,911,299 | 11/1959 | Baril et al. | 96—75 X |
| 2,923,703 | 2/1960 | Bruni et al. | 96—91 X |
| 3,032,414 | 5/1962 | James et al. | 96—75 X |
| 3,145,104 | 8/1964 | Oster et al. | 250—65.1 |

OTHER REFERENCES

Ansco Abstracts, vol. 17, No. 4, table of contents page, page 137, April 1957.

Lundberg et al.: Nature (London), vol. 179, pp. 367–368 (1957).

NORMAN G. TORCHIN, *Primary Examiner.*

C. E. VAN HORN, *Assistant Examiner.*